US006411930B1

(12) United States Patent
Burges (10) Patent No.: US 6,411,930 B1
(45) Date of Patent: Jun. 25, 2002

(54) DISCRIMINATIVE GAUSSIAN MIXTURE MODELS FOR SPEAKER VERIFICATION

(75) Inventor: Christopher John Burges, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/249,414

(22) Filed: Feb. 12, 1999

Related U.S. Application Data (60) Provisional application No. 60/108,972, filed on Nov. 18, 1998.

(51) Int. Cl.[7] .............................................. G10L 15/08
(52) U.S. Cl. ...................... 704/240; 704/245; 704/236; 704/251
(58) Field of Search ................. 704/231, 243, 704/256, 244–246, 236, 238, 200, 248–251, 254, 255, 257, 240

(56) References Cited

U.S. PATENT DOCUMENTS

| | | | | |
|---|---|---|---|---|
| 5,271,088 A | * | 12/1993 | Bahler | 704/200 |
| 5,638,487 A | * | 6/1997 | Chigier | 704/253 |
| 5,806,032 A | * | 9/1998 | Sproat | 704/255 |
| 5,839,103 A | * | 11/1998 | Mammone et al. | 704/232 |
| 5,862,519 A | * | 1/1999 | Sharma et al. | 704/231 |
| 5,960,397 A | * | 9/1999 | Rahim | 704/244 |
| 6,029,124 A | * | 2/2000 | Gillick et al. | 704/200 |
| 6,173,260 B1 | * | 1/2001 | Slaney | 704/250 |

OTHER PUBLICATIONS

Slomka et al., ("A comparison of Gaussian Mixture and Multiple Binary Classifier Models for Speaker Verification", Australian, New Zealand Conference on Intelligent Information Systems, 1996, Nov. 18–20, 1996, pp. 316–319).*
Del Alamo et al., ("Discriminative training of GMM for speaker identification", 1996 IEEE International Conference on Acoustics, Speech, and Signal Processing, vol. 1, pp. 89–92).*

* cited by examiner

*Primary Examiner*—Vijay B Chawan
(74) *Attorney, Agent, or Firm*—Troutman Sanders LLP (57) ABSTRACT

Speaker identification is performed using a single Gaussian mixture model (GMM) for multiple speakers—referred to herein as a Discriminative Gaussian mixture model (DGMM). A likelihood sum of the single GMM is factored into two parts, one of which depends only on the Gaussian mixture model, and the other of which is a discriminative term. The discriminative term allows for the use of a binary classifier, such as a support vector machine (SVM). In one embodiment of the invention, a voice messaging system incorporates a DGMM to identify the speaker who generated a message, if that speaker is a member of a chosen list of target speakers, or to identify the speaker as a "non-target" otherwise.

27 Claims, 5 Drawing Sheets

DISCRIMINATIVE GAUSSIAN MIXTURE MODELS FOR SPEAKER VERIFICATION

CROSS-REFERENCE TO RELATED PROVISIONAL APPLICATION

This application claims the benefit of the Nov. 18, 1998, filing date of Provisional Application Serial No. 60/108,972 entitled "Discriminative Gaussian Mixture Models For Speaker Identification".

FIELD OF THE INVENTION

This invention relates generally to methods and apparatus for use in performing speaker identification.

BACKGROUND OF THE INVENTION

In systems that provide for identification of a speaker, a general technique is to score the speaker's enunciation of a test phrase against each one of a number of individual Gaussian mixture models (GMM) and to select, or identify, the speaker as that person associated with the individual GMM, or set of GMMs, achieving the best score above a certain threshold using, e.g., a maximum likelihood technique. Typically, these systems generate individual GMMs by independently training, a priori, on small (e.g., 30 millisecond (ms.)) speech samples of training phrases spoken by the respective person.

Unfortunately, such systems do not perform well when attempting to discriminate the true speaker from people that merely sound like the true speaker. As such, in an attempt to improve discrimination these systems increase the number of GMMs to include "cohort" or "background" models, i.e., people that sound like the true speaker but are not (e.g., see Herbert Gish and Michael Schmidt, "Text-independent speaker identification," *IEEE Signal Processing Magazine*, pages 18–32, 1994).

Alternatively, for both the speech and speaker recognition problems, a different approach has recently been proposed which uses a discriminative cost finction (which measures the empirical risk) during training in place of the maximum likelihood estimation, giving significantly improved generalization performance (e.g., see, Biing-Hwang Juang, Wu Chou, and Chin-Hui Lee, "Minimum Classification Error Rate Methods for Speech Recognition," *IEEE Transactions on Speech and Audio Processing*, 5(3):257–265, 1997; and Chi-Shi Lui Chin-Hui Lee, Wu Chou, Biing-Hwang Juang, and Aaron E. Rosenberg, "A study on minimum error discriminative training for speaker recognition," *Journal of the Acoustical Society of America*, 97(1):637–648, 1995). However, here the underlying model (a set of hidden Markov models) is left unchanged, and in the speaker recognition case, only the small vocabulary case of isolated digits was considered.

In providing speaker identification systems such as described above, support vector machines (SVMs) have been used for the speaker identification task directly, by training one-versus-rest and one-versus-another classifiers on the preprocessed data (e.g., see M. Schmidt, "Identifying speaker with support vector networks," *Interface '96 Proceedings*, Sydney, 1996). However, in such SVM-based speaker identification systems, training and testing are both orders of magnitude slower than, and the resulting performance is similar to, that of competing systems (e.g., see also, National Institute for Standards and Technology, Speaker recognition workshop, Technical Report, Maritime Institute of Technology, Mar. 27–28, 1996).

SUMMARY OF THE INVENTION

Unfortunately, the above-described approaches to speaker-identification are not inherently discriminative, in that a given speaker's model(s) are trained only on that speaker's data, and effective discrimination relies to a large extent on finding effective score normalization and thresholding techniques. Therefore, I have developed an alternative approach that adds explicit discrimination to the GMM method. In particular, and in accordance with the invention, I have developed a way to perform speaker identification that uses a single Gaussian mixture model (GMM) for multiple speaker—referred to herein as a Discriminative Gaussian mixture model (DGMM).

In an illustrative embodiment of the invention, a DGMM comprises a single GMM that is used for all speakers. A likelihood sum of the GMM is factored into two parts, one of which depends only on the Gaussian mixture model, and the other of which is a discriminative term. The discriminative term allows for the use of a binary classifier, such as a support vector machine (SVM).

In another embodiment of the invention, a voice messaging system incorporates a DGMM. The voice messaging system comprises a private branch exchange (PBX) and a plurality of user terminals, e.g., telephones, personal computers, etc.

DETAILED DESCRIPTION

Before describing an illustrative embodiment of the invention, a brief background is provided on the above-mentioned prior art speaker identification approach using individual, non-discriminative, GMMs. In the following description, the phrase "target speaker" means a speaker whose identity the respective system is supposed to determine (note, there may be non-target speakers in the training and test sets). Other than the inventive concept, it is assumed that the reader is familiar with mathematical notation used to generally represent kernel-based methods as known in the art. Components of vectors and matrices are labeled with Greek indices, vectors and matrices themselves are labeled with Roman indices.

Gaussian Mixture Models: The Standard Approach

In a typical GMM system, one (or several) GMMs are built for each speaker. The data is preprocessed into low dimensional feature vectors, typically using 20 ms frame sizes and 10 ms steps. The features used are often some or all of the following (as known in the art): vectors of cepstral, delta-cepstral, and delta-delta-cepstral coefficients, a scalar measure of energy, and a scalar measure of pitch.

A Gaussian mixture model is simply a weighted sum of Gaussian densities, where the positive (scalar) weights sum to unity (which results in the sum itself being a density). It is desired to model the posterior conditional probability $P(S_i|x_1, \ldots, x_m)$, where $S_{i=1, \ldots, N_S}$ labels one of $N_S$ target speakers (i=1, \ldots, $N_S$), and $x_k \in \mathbb{R}^n$ is one of m feature vectors, each of which is derived from a different portion of the speech signal. Bayes' rule gives:

$$P(S_i | \tilde{x}) = \frac{p(\tilde{x}|S_i)P(S_i)}{p(\tilde{x})}, \quad (1)$$

where here and below, P denotes probabilities, p the corresponding densities, and $\tilde{r}$ is shorthand for the set of feature vectors $x_1, \ldots, x_m$. Thus in order to find the target speaker who most likely generated a given set of test feature vectors $\tilde{x}$, the posterior probability $P(S_i|\tilde{x})$ is maximized over the choice of speaker $S_i$. If it is assumed that all speakers have equal priors ($P(S_i)$=constant) then clearly this amounts to finding the maximum likelihood ($p(\tilde{x}|S_i)$) over all target speakers. This approach is sufficient for the "closed set" problem, where the test speech is guaranteed to have originated from a target speaker. In the harder, "open set" problem, the speech may or may not have been generated by a target speaker, and some thresholding algorithm is necessary to decide whether to reject or accept the message (i.e., whether to assert that it was generated by one of the target speakers). In the description that follows, the open set problem is considered and the assumption is made that the random variables $x_1, \ldots, x_m$ are independent, so that the density ($p(\tilde{x}|S_i)$) can be expanded as a product. The likelihood is then modeled as a Gaussian mixture:

$$p(\tilde{x}|S_i) = \prod_{k=1}^{m} p(x_k | S_i) \quad (2)$$

$$= \prod_{k=1}^{m} \prod_{j=1}^{N_c} P(C_j | S_i) p(x_k | S_i, C_j)$$

$$p(x_k | S_i, C_j) = (2\pi)^{-d/2} |\Sigma_{ij}|^{-1/2} \exp\left(-\frac{(x_k - \mu_{ij})^T \Sigma_{ij}^{-1} (x_k - \mu_{ij})}{2}\right) \quad (3)$$

where the sum in equation (2) is over a set of $N_C$ mutually exclusive and complete events ("clusters") $C_j$ and where $\mu_{ij}$ is the mean for the Gaussian distribution for speaker i's j'th cluster, $\Sigma_{ij}$ is the corresponding covariance matrix (recall that i, j here label the vectors and matrices themselves, not their components), and $|\Sigma_{ij}|$ its determinant (e.g., see A. A. Sveshnikov, *Problems in probability theory, mathematical statistics and theory of random functions*, Dover Publications, New York, 1978).

To train a GMM for a given speaker $S_i$, one starts by specifying how many Gaussians to use (Nc). This is typically anywhere from 20 to 150. Some in the art choose 50 to roughly match the number of phonemes (e.g., see article by Gish and Schmidt, cited above). Then the training feature vectors are clustered into $N_C$ clusters, using, for example, the K means algorithm (e.g., see V. Fontaine, H. Leich, and J. Hennebert; "Influence of vector quantization on isolated word recognition," in M. J. J. Holt, C. F. N. Cowan, P. M Grant, and W. A. Sandham, editors, *Signal Processing VII, Theories and Applications; Proceedings of EUSIPCO-94, Seventh European Signal Processing Conference*, volume 1, pages 116–18, Lausanne, Switzerland, 1994, Eur. Assoc. Signal Process). The resulting means and covariances form the starting point for GMM training, for which a simple variant of the EM algorithm is used (e.g., see, A. P. Dempster, N. M. Laird, and D. B. Rubin, "Maximum Likelihood from Incomplete Data via the EM Algorithm," *Journal of the Royal Statistical Society* B, 39(1):1–22, 1977; and the article by Fontaine et al, cited above). In particular, for each cluster, and given the cluster memberships output by the K means algorithm, the mean and covariance matrices are recomputed:

$$\mu_i = \frac{1}{|C_i|} \sum_{a=1}^{|C_i|} x_a, \, x_a \in C_i \quad (4)$$

$$\sum_i \frac{1}{|C_i|} \sum_{a=1}^{|C_i|} (x_a - \mu_i)(x_a - \mu_i)^T, \, x_a \in C_i \quad (5)$$

In equations (4, 5), the $x_a$ are those feature vectors which are members of cluster $C_i$, where cluster membership is determined by maximum likelihood. Then the cluster memberships are recomputed using likelihoods computed using the new means and covariances. The maximum likelihood cluster for vector x is thus given by $$C_i * (x) = \arg\max_{C_i} P(C_i | x) \quad (6)$$

$$= \arg\max_{C_i} \frac{p(x | C_i) P(C_i)}{p(x)}$$

$$= \arg\max_{C_i} p(x | C_i) P(C_i)$$

It should be noted that this is really a maximum posterior computation, since the priors $P(C_j)$ (which are estimated by counting cluster memberships) are used. This two-step process is then iterated until convergence (i.e. until cluster membership stabilizes).

In test phase, one computes the sum log likelihood $$\log \prod_{k=1}^{m} p(x_k | S_i) = \sum_{k=1}^{m} \log p(x_k | S_i) \quad (7)$$

$$= \sum_{k=1}^{m} \log \sum_{j=1}^{N_C} p(x_a | S_i, C_j) P(C_j | S_i)$$

that a given test message (from which m feature vectors were extracted) was generated by a given speaker $S_i$'s GMM, and combined with a suitable normalization and thresholding scheme, either rejects the message (i.e., asserts that the message was not generated by a target speaker), or identifies the target and outputs a confidence value. Here $p(x_a|S_i,C_j)$ is given by equation (3), and $P(C_j|S_i)$ is estimated by counting cluster memberships for speaker i's training data.

An intriguing property of the Gaussian distribution is that the dependence of the above sum on the test data can be described solely in terms of the mean and covariance of the set of test feature vectors (e.g., see above-cited Gish et al. article). Furthermore, the resulting expression can be derived by asking for the likelihoods of two characteristic statistics of the test data, namely its mean and covariance matrix. These observations lead to the idea of using the likelihoods of test mean and covariance as contributions to a weighted sum of likelihoods, resulting in the "modified Gaussian models" as described in the above-cited article of Gish et al. One can then easily incorporate the likelihood for the delta-cepstral covariance matrix into the sum (the delta-cepstral mean contains no new information).

The key remaining problem is how to normalize the scores from different GMMs so that they can be compared, in such a way that good discrimination results. The above-cited article by Gish et al., suggests a number of possibilities. First, if one has training messages corresponding to different sessions for a given speaker, at least one model is built for each, in the hope of capturing channel or session variations. One may further split a given training message into pieces and build a GMM for each piece, in order to model variation due to, for example, the occurrence of multiple speakers in the same message. A test message is also segmented, and each test message is attached to whichever model gives it the highest likelihood. The score is then normalized by dividing that likelihood by the highest occurring likelihood for that message for all models for all other speakers. Often, many "cohort" speakers (a target speaker's cohorts are a set of other speakers which are attributed high likelihood scores by that speaker's model) are added to the training set to help in the score normalization and discrimination. Even after normalization, there are many possible approaches to how to combine scores from different segments. Finally, given such an approach, it is useful also to estimate confidence values for the resulting score (e.g., see the above-cited article by Gish et al.).

Discriminative Gaussian Mixture Models

Unfortunately, the above approach is not inherently discriminative, in that a given speaker's model(s) are trained only on that speaker's data, and effective discrimination relies to a large extent on finding effective score normalization and thresholding techniques. Therefore, I have developed an alternative approach that adds explicit discrimination to the GMM method. In particular, and in accordance with the invention, I have developed a way to perform speaker identification that uses a single Gaussian mixture model (GMM) for multiple speakers—referred to herein as a Discriminative Gaussian mixture model (DGMM). Other than the inventive concept, the techniques described below encompass techniques found in standard speech preprocessing for use in speech recognition as well as speaker recognition.

The DGMM approach is based on two key ideas. First, create a single GMM for all target speakers. Thus this GMM is intended to model all speech generated by these speakers. (The building of a GMM to model all speech can also be explored.) Second, the basic GMM model is extended to directly include discrimination. For this, Support Vector machines (SVMs) are used (although any binary classifiers could be used for the discrimination subsystem).

Consider a single feature vector x. The desired posterior probability is expanded as:

$$P(S_i \mid x) = \sum_j P(S_i \mid x, C_j) P(C_j \mid x) \qquad (8)$$

Although the expansion is formally similar to that of equation (2) (both are just expressions of the formula for total probability, and require only that the events $C_j$ be mutually exclusive and complete), the meaning is rather different. In equation (2), the $C_j$ are simply a partition of the density for a given speaker, and are only required to account for data generated by that speaker; the underlying assumption is that a particular observed vector x is generated by one and only one of the $C_j$. In equation (8), the underlying assumption is that a given x is still generated by one and only one of the $C_j$ (mutual exclusivity) and the probabilities $P(C_j)$ still sum to one (completeness), but the $C_j$ are no longer associated with only a single speaker. However, one may still think of them as clusters, in the sense that a given vector x can be attached to a single cluster by maximum likelihood (barring the unlikely event that x has the same maximum likelihood in more that one cluster).

At this point, the two terms appearing in the sum in equation (8) are examined. The discrimination will be built into the first term, which is modeled as:

$$P(S_i \mid x, C_j) \approx P(S_i \mid y_{ij}(x), C_j) \qquad (9)$$

where $y_{ij}(x)$ is the output of an SVM, given x as an input, and where the SVM has been trained to distinguish speaker i from all other speakers, so that a more positive $y_{ij}$ indicates more evidence in favor of speaker i. Equation (9) is an approximation: given some feature vector x associated with cluster $C_j$, the probability that it was generated by speaker i is modeled using a binary classifier, trained to distinguish feature vectors from speaker i (in cluster j) from feature vectors from all other speakers in cluster j. The assumption is that the information about the identity of speaker i that is encapsulated in the feature vector x can be extracted and represented by a real-valued function y(x). However this is exactly what a real-valued binary classifier is supposed to do. Clearly in the case where the data x are separable, in such a way that the class labels are in 1-1 correspondence with the speakers, the approximation becomes exact (the above probabilities become 0 or 1). At the opposite extreme, when a given vector x is equally likely to have been generated by any one of the target speakers, the $y_{ij}$ are also not likely to be significantly more positive for any particular speaker i than for any other speaker, leading to equal $P(S_i \mid y_{ij}(x), C_j)$. In the intermediate case, where the densities overlap, but where discrimination is still possible, equation (9) essentially uses the classifier alone as a method for function approximation, where the function being approximated is the posterior probability.

Again, using Bayes' rule, the following can be written:

$$P(S_i \mid y_{ij}(x), C_j) = \frac{p(y_{ij}(x) \mid S_i, C_j) P(S_i \mid C_j)}{p(y_{ij} \mid C_j)} \qquad (10)$$

Since the y are real-valued outputs of a binary classifier, the denominator can be written as the sum of two densities, one corresponding to outputs from the target speaker $S_i$, and one corresponding to outputs from all non-target speakers, denoted $\overline{S}_i$:

$$p(y_{ij} \mid C_j) = p(y_{ij} \mid S_i, C_j) P(S_i \mid C_j) + p(y_{ij} \mid \overline{S}_i, C_j) P(\overline{S}_i \mid C_j) \qquad (11)$$

Thus, the desired posterior probability becomes (the role of γ is discussed further below):

$$P(S_i \mid x) = \sum_j A(x, S_i, C_j) B(x, C_j) \qquad (12)$$

$$A(x, S_i, C_j) = \frac{p(y_{ij}(x) \mid S_i, C_j) P(S_i \mid C_j)}{p(y_{ij} \mid S_i, C_j) P(S_i \mid C_j) + p(y_{ij} \mid \overline{S}_i, C_j) P(\overline{S}_i \mid C_j)} \qquad (13)$$

$$B(x, C_j) = \frac{p(x \mid C_j) P(C_j)}{\left(\sum_{j'} p(x \mid C_{j'}) P(C_{j'})\right) + \gamma}. \qquad (14)$$

Note that $p(y_{ij}(x) \mid S_i, C_j)$ and $p(y_{ij}(x) \mid \overline{S}_i, C_j)$ are easily modeled using the outputs of the classifier, since they are one dimensional densities which are straightforward to estimate using a validation set, in contrast to the modeling of multidimensional densities. The $P(S_i \mid C_j)$ and $P(C_j)$ can be estimated by counting cluster memberships. Note that if the training set is dominated by a small subset of speakers, $P(S_i \mid C_j)$ and $P(S_i)$ will vary significantly, and in some applications this may be useful prior knowledge. However, if it is known that the application is one in which $P(S_i)$ will vary significantly over time scales longer than that over which the training data was collected, in the absence of a model for such variation, and assuming that the system is not constantly retrained, it is safest to adopt the "uninformative priors" position and assume that all P(S$_i$) are equal.

As noted above, the inventive concept comprises the notion of using a single GMM, and performing discrimination within that GMM. Two examples are described below. In the first, the "target-speech" model, only speech from target speakers is used to create the single GMM. In the second, the "all-speech" model, a single GMM is trained using a large pool of speakers (possibly including the target speakers, possibly not), with the intent that the resulting GMM is a representative model for all speech from which targets are likely to be drawn. (Here, the idea is to train a GMM once using a very large amount of data (which is referred to herein as pool data, below), and then to use this as a fixed GMM for the speaker ID task). Note that in both methods, during the classifier training feature vectors from non-target speakers can be used to supplement the set of counterexamples. A key property shared by both approaches is that the method "factors out" much of the variation in the signal before it is presented to the classifiers: thus to the extent that the single GMM models phonemes, a given classifier, such as an SVM, is trained to distinguish a particular phoneme for one speaker from that of other speakers.

Usually, when using SVMs for multiclass problems, the decision is made based on heuristic measures, such as the distance from the separating hyperplane (e.g., see C. Cortes and V. Vapnik, "Support vector networks," *Machine Learning*, 20:273–297, 1995; and C. J. C. Burges, "A tutorial on support vector machines for pattern recognition," *Data Mining and Knowledge Discovery*, 2(2):121–167, 1998). The methods described here have the advantage that the SVM outputs are combined in a principled way with the Gaussian density models. For the case when the classifier outputs are very noisy, as they are here, this is especially advantageous over the approach of directly using SVM classifiers on the preprocessed data.

The target-speech model combines advantages of both classifier and GNM approaches. In clusters where speaker discrimination is hard, the two distributions for the $y_{ij}$ (for positive and negative examples) in equation (12) will overlap significantly, and the terms will be dominated by the priors P(S$_i$|C$_j$), P(C$_j$) and the likelihoods p(x|C$_j$), reducing to a GMM-like solution; in clusters where speaker discrimination is easier, the term A(x, S$_i$, C$_j$) in equation (13) will vary significantly, taking very small values for negative examples, and becoming O(1) for positive examples, and the method approaches that of classical pattern recognition. However, it is worth considering what the expansion represented by equation (8) means in this case. As in the standard technique, the clusters are found using only target speech, and the hope is that non-target speakers will get low likelihoods. In fact much of the work around GMMs centers on how to add discrimination on top of the basic GMM approach in order to compensate for the GMM's tendency to give high likelihoods to non-target speakers (e.g., see the above-cited article by Gish et al.). In the DGMM case, the basic model has two weapons for rejecting non-target speakers: low cluster likelihood, P(C$_j$|x), and low classifier outputs, P(S$_i$|y$_{ij}$(x),C$_j$). Since the DGMM here models only target speech, the role of the term γ in equation (14) is to allow non-target speech to result in low likelihoods. The term γ can be viewed as a constant approximation to a sum over a set of other clusters, corresponding to data generated by non-target speakers.

The all-speech model method may be viewed as relying on the binary classifiers for discrimination, and using the Gaussian mixtures as an additional preprocessing step. The model has the advantage that it need not be recomputed given a new set of target speakers. (It should be noted that one might consider incremental training schemes, in which the GMM is further trained with the target speakers added to the pool.) Furthermore, a set of highest-likelihood counterexamples for classifier training can be computed once, and added to those computed from any speakers whose data became available after the GMM was trained. As before, the p(x|C$_j$) are modeled as Gaussian densities, and P(C$_j$) are estimated using cluster membership counts. In computing the posterior probability P(S$_i$|x) in equation (12), P(C$_j$) in equation (14) can computed from all the data, and P(S$_i$|C$_j$) in equation (13) from cluster membership counts using only the target data. Since the DGMM here models all speech from which target speech will be drawn, the role of the term γ in equation (14) is to give low likelihood to a non-speech signal, for example one that is dominated by channel noise. The term γ can thus be viewed as a constant approximation to a sum over a set of other clusters, corresponding to non-speech data.

The description above was for the case of a single feature vector x. However, the inventive concept can be extended to handle multiple feature vectors (from the same speaker). Again, it is desired to find that speaker S$_i$ for which P(S$_i$|x̃) is maximized. Again assuming that the x$_i$ are independent:

$$P(S_i | \tilde{x}) = \frac{p(\tilde{x} | S_i) P(S_i)}{p(\tilde{x})} \quad (15)$$

$$= P(S_i) \prod_{k=1}^{m} \frac{p(x_k | S_i)}{p(x_k)}$$

$$= P(S_i) \prod_{k=1}^{m} \frac{p(S_i | x_k)}{P(S_i)}$$

If all priors P(S$_i$) are equal then maximizing P(S$_i$|x̃) over all S$_i$ is equivalent to maximizing $\Sigma_{k=1}^{m}$ log P(S$_i$|x$_k$) Otherwise, one must find the S$_i$ that maximizes:

$$\log P(S_i) + \sum_{k=1}^{m} \log\left(\frac{P(S_i | x_k)}{P(S_i)}\right) \quad (16)$$

Training a DGMM thus proceeds in two steps: training the GMM, as described above (e.g., see the equations (4), (5) and (6) and respective text); and then using the resulting GMM to cluster the data to generate SVM training data. For a given cluster, and a given SVM (there are N$_S$ SVMs per cluster), the positive examples are generated in order of likelihood. Suppose speaker S's vectors are ordered by likelihood for a given cluster C. Furthermore, suppose n$_{SC}$ is the number of speaker S's vectors that fall into cluster C when that speaker's vectors are assigned to all N$_C$ clusters via maximum likelihood. The number of positive examples for the corresponding SVM is then taken to be max(n$_{SC}$, n$_{min}$), where n$_{min}$ is a user-chosen minimum number of positive examples required to train an SVM (e.g., assume that n$_{min}$=250). If it is assumed that the number of negative examples was fixed at 2000, the examples are again found by ordering the vectors for all speakers other than speaker S by likelihood for cluster C. Finally, after a given set of vectors have been set aside to train a given SVM, the next 100 negative and 100 positive examples (again ordered by likelihood) are used as a validation set to estimate the density in equation (13).

Note that this method is very easily extended to handle the equivalent of cohort speakers. One can simply add the (non-target) data to that on which the GMM was trained, before computing the SVM training data. Any data thus added that gets high enough likelihood scores will appear as negative examples for the SVMs. Finally, training speed and generalization performance can be improved by Mahalonobis renormalizing the data, according to:

$$x' = L^{-1}(x-\mu) \qquad (17)$$

prior to SVM training and testing. Here L is the lower triangular matrix used in the Cholseki decomposition of $\Sigma = LL^T$. Note that this renormalization is not unique, in that there are other transformations that also result in $x'^T \cdot x' = (x-\mu)^T \Sigma^{-1}(x-\mu)$, but in our case this does not matter, since only dot products of the data appear in both SVM training and testing for the kernels used. Loosely speaking, this renormalization is removing variation from the data which is already accounted for by the GMM, thus easing the learning task faced by the SVM; note that the renormalized training data has zero mean and unit covariance matrix.

With respect to the test phase of a DGMM, clearly if all terms in the sum in equation (8) are allowed to appear, the test phase will be slow (e.g., for 20 speakers and 50 clusters, 1000 SVMs would have to be evaluated), and worse, SVMs will be applied to data for which they were not trained, in the sense that SVMs for all clusters will be applied to data whose likelihood exceeds a given threshold in only a few clusters. Recalling that a given SVM is associated with a particular cluster and a particular speaker (in the sense that its training data is generated via likelihood computations for that cluster, and the positive/negative labels for the data are determined by that speaker's identity), there are two possible remedies: (1) cluster the data via maximum likelihood, and then use the corresponding SVMs for each cluster, or (2) only use an SVM on a given vector if its likelihood (P(C|x) in equation (8) exceeds some user-chosen threshold. The latter method has been experimentally found to give better results, which are described below. Note that both methods require a means of handling vectors which fall below threshold. If one simply does not include them in the sum, then one is discarding evidence that this speaker is not a target speaker. On the other hand, if they are included by attaching a fixed penalty score for $P(S_i|xC_j)$ in equation (8), then the resulting contribution to the sum can swamp the contribution from the above-threshold vectors. One simple heuristic solution to this is to penalize the mean log likelihood resulting from just the above-threshold vectors by an amount which depends on the fraction of vectors which fell below threshold. However, as described herein, only the simplest approach, that of discarding the below-threshold vectors is considered.

The above approach requires that one estimate the posterior probabilities $P(S_i|y_{ij}(x),Cj)$. As explained above, one method to do this is to express this quantity as a ratio of densities as in equation (13). This has the advantage of giving a principled way to incorporate the priors $P(S_i|C_j)$, but it requires that one estimate the one-dimensional densities of the support vector outputs. The solution to this is described below.

Denote the density of the input data by p(x). A support vector machine may be viewed as a real valued function $y(x)=\Sigma_i \alpha_i z_i K(x, x_i)+b$, where the $\alpha$ are positive Lagrange multipliers found by the training procedure, $x_i$ are the training points and $z_i \in \{\pm 1\}$ their polarities, and b is a threshold, also determined by training (for more details, see for example the above-mentioned articles by Cortes et al.; and Burges; and also V. Vapnik, "The Nature of Statistical Learning Theory," Springer-Verlag, New York, 1995). The sum over the kernel functions is in fact an inner product in some Hilbert space H between the mapped point $\phi(x) \in H$ and some vector $w \in H$ (the mapping $\phi$, and the space H, are both determined by the choice of kernel K). (In fact, K only determines the value of the inner product of two mapped vectors, according to $K(x_1,x_2)=\phi(x_1)\cdot\phi(x_2)$. For a given choice of K, in general neither the space H nor the mapping $\phi$ are uniquely determined.) The density of the random variable y in terms of p(x) and K may therefore be written as:

$$p(y) = \int \delta(y - w \cdot \phi(x) - b) p(x) dx \qquad (18)$$

$$= \int \delta\left(y - \sum_i \alpha_i z_i K(x, x_i) - b\right) p(x) dx.$$

In general, exact computation of this density is not feasible, since p(x) is unknown. Even if p(x) were known, an exact expression may be elusive: one can view the kernel mapping as a mapping of the data to an n-surface in H (recall that $x \in R^n$), and this surface will in general have intrinsic curvature (e.g., see C. J. C. Burges, "Geometry and invariance in kernel based methods" in B. Scholkopf, C. J. C. Burges, and A. J. Smola, editors, "*Advances in Kernel Methods: Support Vector Learning*," MIT Press, 1998), so when one projects onto a given direction, p(y) may have contributions from quite different parts of the mapped surface, making evaluation of equation (18) difficult. In the special case when the mapped data is normally distributed in H, it is straightforward to show that y must then itself be a one dimensional Gaussian. Therefore, for the purposes of this paper it is assumed that y has Gaussian distribution.

Figure 1:
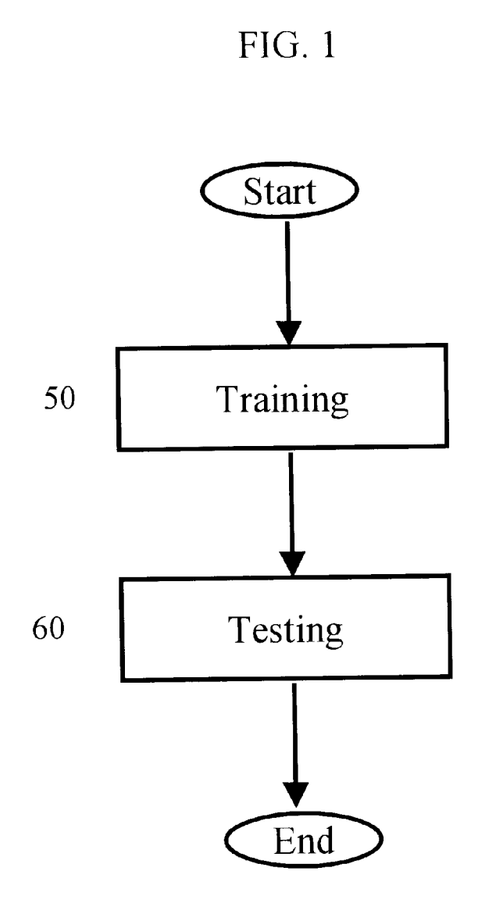
FIG. 1 is an illustrative flow chart embodying the principles of the invention.

At this point, attention is directed to the figures, which illustrate some applications of the inventive concept. Other than the inventive concept, the elements shown in the figures are well-known and will not be described in detail. An illustrative flow chart embodying the principles of the invention is shown in FIG. 1 for use in a voice mail system. In step 50, a DGMM is trained on a set of target speakers (e.g., see the equations (4), (5) and (6) and respective text). As noted earlier, training involves the labeling and collection of sound clips of various people. For example, as a user retrieves voice mail messages, the user labels each message as being associated with a particular person. In step 60, testing is performed on newly received voice mail. In particular, as each newly received voice mail is stored, the corresponding sound clips are tested against the training data using the DGMM. Test results include an identification of a particular person (whose data was used in the above-mentioned training phase) and a confidence level as to the accuracy of the decision. (Although not described, the labeling process involves adding a "label" field to the storage parameters for a voice mail message. This label field is associated, e.g., via a separately stored data base (not shown) with particular individuals. Further examples of labeling and testing are described below in the context of some illustrative systems embodying the principles of the invention.)

Figure 2:
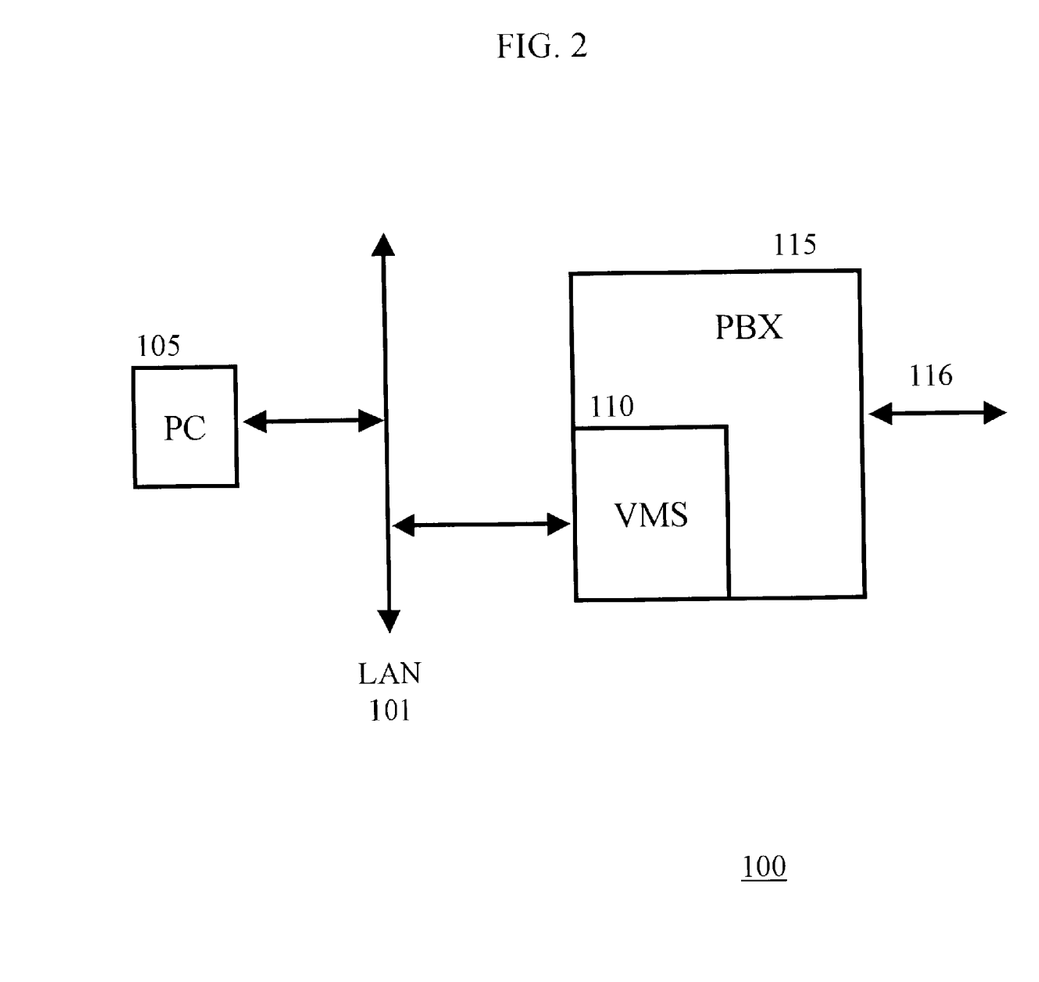
FIGS. 2–5 show illustrative block diagrams of DGMM voice mail systems embodying the principles of the invention.

An illustrative DGMM system 100 in accordance with the principles of the invention is shown in FIG. 2. DGMM 100 comprises personal computer (PC) 105, local area network (LAN) 101, private branch exchange (PBX) 115, which includes voice mail server (VMS) 110. It is assumed that PC 105 represents one of a number of client-type machines coupled to LAN 101. VMS 110, of PBX 115, is also coupled to LAN 101. PBX 115 receives communications via facility 116, which represents any one of a number of voiceswitched lines, e.g., analog, T1, etc. Illustratively, PBX 115 receives telephone calls via facility 116 and, when necessary, provides voice mail functionality for the creation and storage of voice mail messages. For the purposes of this description, it is assumed that VMS 110 performs the above-described steps shown in FIG. 1.

As is known in the art, a user associated with PC 105 receives notification of newly received voice mail via LAN 101 by a respective notification message from VMS 110. For example, the notification message can be a "pop-up" icon, email message, etc. In accordance with the principles of the invention, each notification message comprises at least the following information: an identification field and a confidence level. In particular, VMS 110 tests each newly received voice mail message using a DGMM. If VMS 110 identifies a potential sender of the message, the identification field identifies the person and the confidence level provides an estimate as to the accuracy of the decision, or selection, of that person. If VMS 110 does not identify a potential sender, the identification field provides a suitable message, e.g., "not a target speaker."

In accordance with the inventive concept, the user associated with PC 105 can gradually build-up a collection of sound clips for use in identifying callers. For example, initially, each notification message sent by VMS 110 to the user will indicate the message "not a target speaker." However, the user then "labels" the associated voice mail by replying, i.e., sending a responsive message, back to VMS 110. The responsive message indicates the associated voice mail message and includes a name of a person. Upon receipt of the responsive message, VMS 110 creates a label for this newly identified person. Once sufficient sound clips have been collected for the newly identified person, VMS 110 begins training. (It should be noted that other techniques can be used for identifying and labeling sound clips for training. For example, an application program, which, upon execution in a client, recovers current stored voice mail message headers (e.g., a speech to text transcription of calling party and/or calling number, etc.) from VMS 110 for display in one column of a two column list form on a screen (not shown) of PC 105. The other column of the list allows entry by the user of a name of an associated person, i.e., a label for the voice mail. A "submit" button causes the list information to be sent back to VMS 110, which then performs training on the identified sound clips. Other than the idea of using such an application program in conjunction with the inventive concept, such application programs use standard programming techniques and, as such, will not be described herein. NetScape® is illustrative of an application suite that will serve as such a platform.) Subsequently received voice mail messages are then tested against the trained data.

Figure 3:
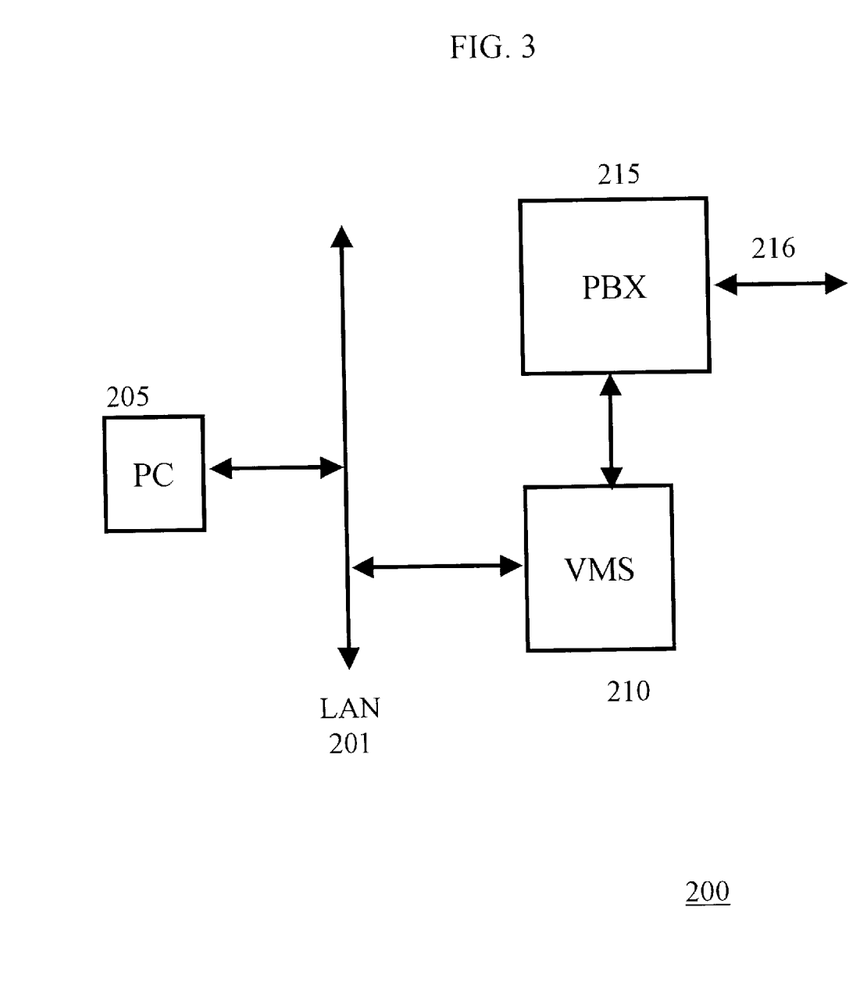
Figure 4:
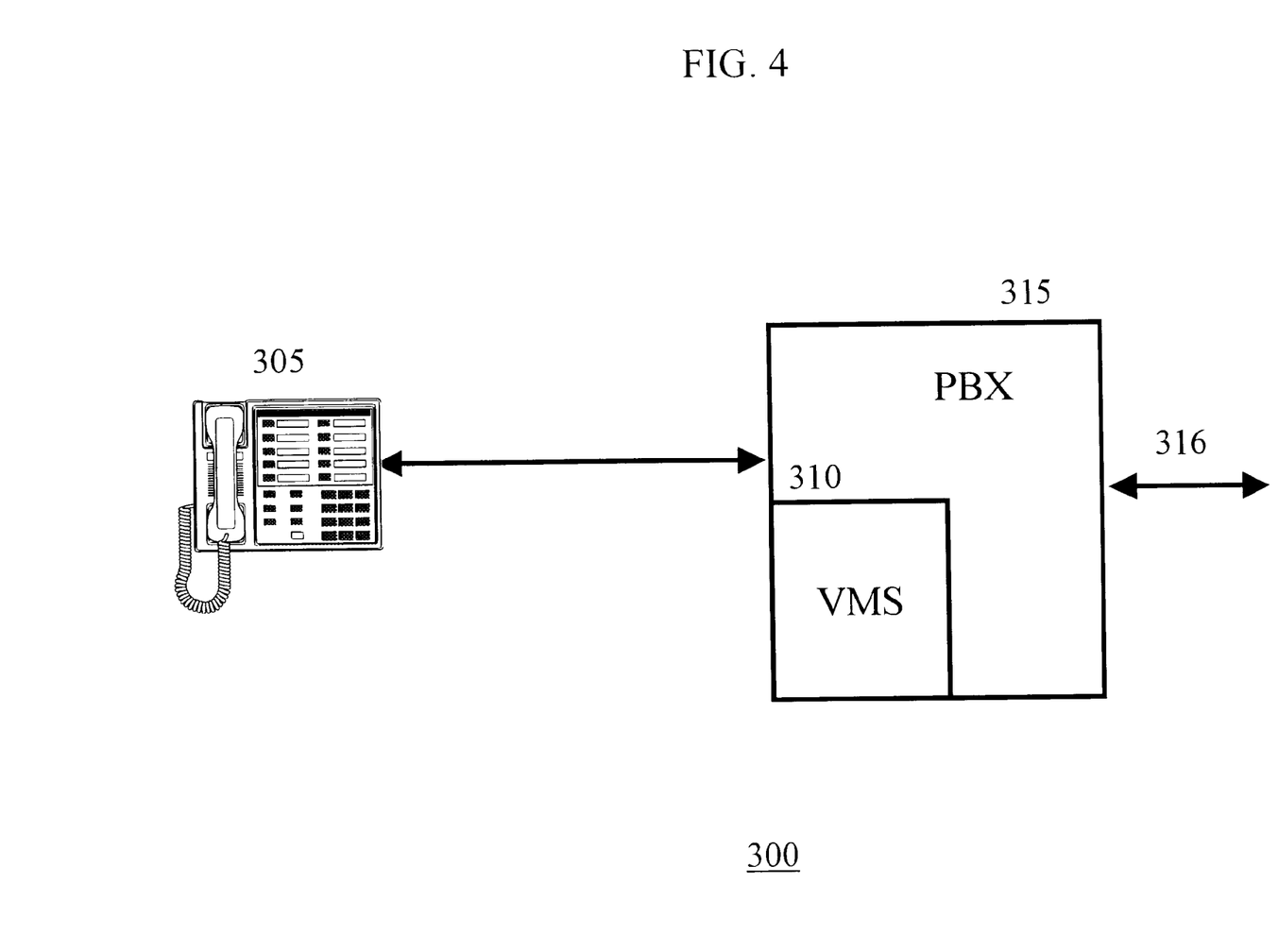

Other illustrative systems are shown in FIGS. 3 and 4. These systems operate in a similar fashion to that shown in FIG. 2 and, as such, will not be described herein in the interests of brevity except as noted below. For example, it should be noted that in DGMM 200, of FIG. 3, VMS 210 is separate from, and separately coupled to, PBX 215. (It should also be noted that PBX 215 could communicate to VMS 210 via a LAN connection (not shown) to LAN 201.) With respect to FIG. 4, it is assumed that a user associated with telephone 305, which is coupled to PBX 315, performs the above-described retrieving and labeling of voice mail messages via the touch-tone keypad of telephone 305. In this context, identification and confidence levels for each newly received voice mail are generated via audio signals from VMS 310. For example, in addition to announcing the time and date of a newly received voice mail, VMS 310 announces the identification (if possible) and the associated confidence level.

Figure 5:
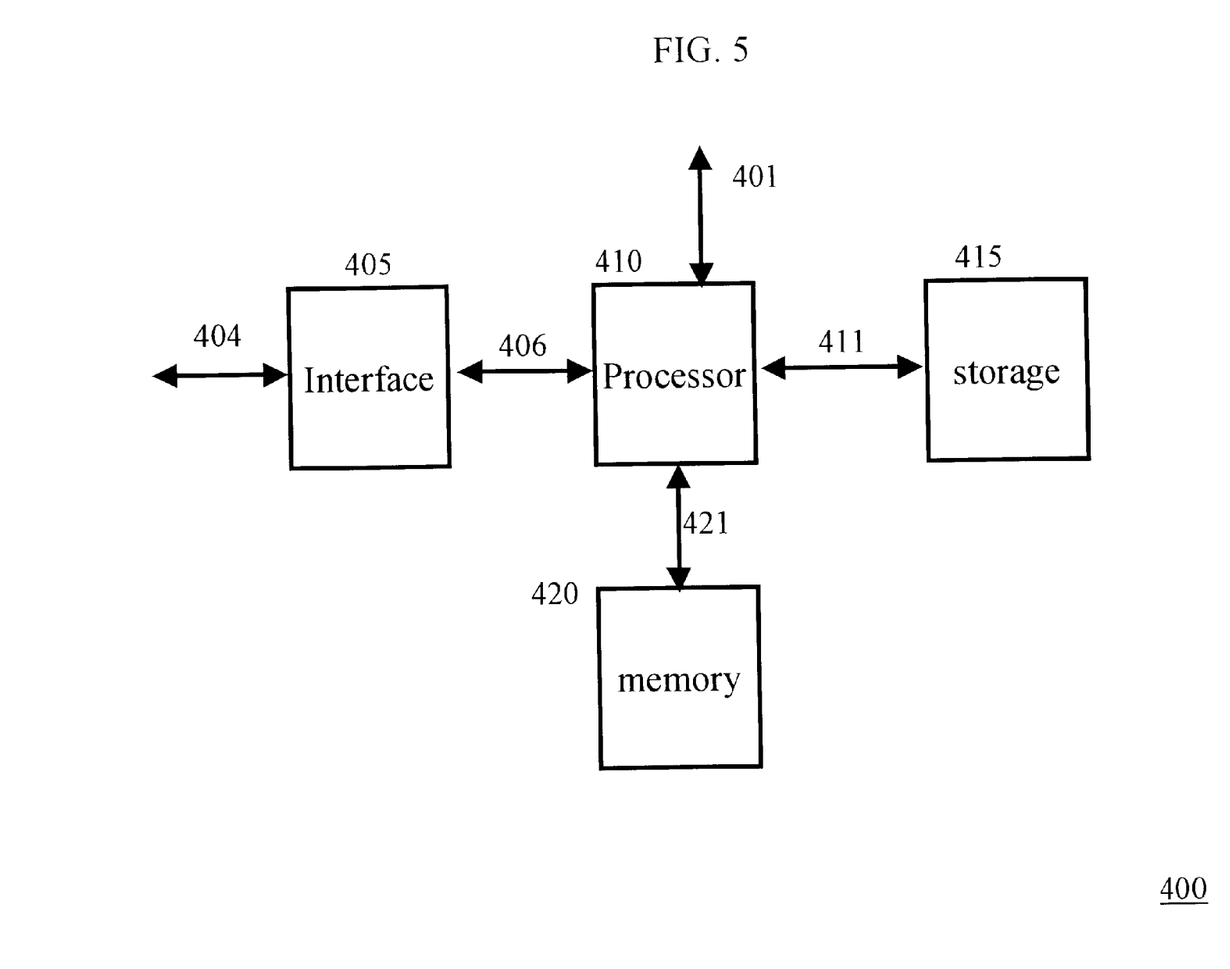

FIG. 5 shows an illustrative voice mail server (VMS) 400 embodying the principles of the invention. VMS 400 comprises interface unit 405, which couples VMS 400 to, e.g., LAN 101. Processor 410 is a stored-program control processor and executes a DGMM program stored in memory 420. Storage element 415 provides storage for sound clips, label data, etc. Line 401 represents a suitable interface element for coupling to a PBX (not shown). This coupling can either be internal if VMS 400 is a part of the PBX (as shown in FIG. 2) or external, if VMS 400 uses a separate connection to the PBX (as shown in FIG. 3). (If the PBX communicates with VMS 400 via a LAN, then, obviously, line 401 is not necessary.)

It should be noted that although the inventive concept is illustratively shown in the context of a majority of the processing taking place in a voice mail server, the functional partitioning between a client and a server can be in any proportion. For example, training could be performed on a server, while the client performs testing (either using the data stored on the server, or periodically updating (from the server) a respective data base in the client), or training could also be performed on the client.

Other variations are possible. For example, thresholds used during the testing process can be varied as a function of detected system differences. One such example is varying the thresholds used to test the sound clip as a function of the telephone used to convey the voice mail from the calling party. In this example, the thresholds used if the telephone is coupled to the PBX can be lower than if a call from an outside line is detected. Phone identification can be performed using caller identification, e.g., by incorporating such information in priors.

The foregoing merely illustrates the principles of the invention and it will thus be appreciated that those skilled in the art will be able to devise numerous alternative arrangements which, although not explicitly described herein, embody the principles of the invention and are within its spirit and scope.

What is claimed:

1. In a method for performing speaker verification, wherein the identified speaker is determined to belong to a speaker set comprising N target speas, where N>1, the improvement comprising:
   adding discrimtion to a Gaussian mixture model (GMM);
   wherein said discrination is based at least upon characteristics of all of said speaks; and
   wherein a single GMM is used for the speaker set.

2. The method of claim 1 further comprising the step of using binary classifiers for selecting the identified speaker.

3. The method of claim 2 wherein the binary classifiers are support vector machines.

4. The method of claim 1 further comprising the steps of:
   training the discriminative GMM on speech;
   generating support vector machine training data by clustering data resulting from the GMM training step; and
   using at least one support vector machine for selecting the identified speaker.

5. The method of claim 4 wherein the speech used for GMM training includes speech from at least one target speaker.

6. The method of claim 4, wherein the using step uses a support vector machine to process a speech sample if other processing of the speech sample relative to a predefined threshold indicates that the speech sample exceeds the predefined threshold.

7. The method of claim 6, wherein the predefined threshold is a measure of a likelihood that the speech sample came from a GMM cluster.

8. The method of claim 1 further comprising the steps of:

training the GMM on speech;

clustering data resulting from the training step;

associating N support vector machines for each cluster; and using at least one of the support vector machines for selecting the identified speaker.

9. The method of claim 8, wherein the speech used for GMM training includes speech from at least one target speaker.

10. The method of claim 8, wherein the using step uses a support vector machine to process a speech sample if other processing of the speech sample relative to a predefined threshold indicates that the speech sample exceeds the predefined threshold.

11. The method of claim 10, wherein the predefined threshold is a measure of a likelihood that the speech sample came from a cluster of GMM data.

12. A method for use in a voice messaging system for verfying a speaker, the method comprising the steps of:

training a Gausian mixture model (GMM) on speech, wherein the GMM is used for N speakrs, where N>1 and wherein said training is based at least upon characteristics of all of said N speakers;

generatmg support vector machine training data by clustering data resulting from the training step; and using at least one support vector machine to determine that the speaker belongs to the set of said N speakers.

13. The method of claim 12 wherein the speech used for GMM training includes speech from at least one of the N speakers.

14. The method of claim 12, wherein the using step uses a support vector machine to process a speech sample if other processing of the speech sample relative to a predefined threshold indicates that the speech sample exceeds the predefined threshold.

15. The method of claim 14, wherein the predefined threshold is a measure of a likelihood that the speech sample came from a cluster of GMM data.

16. The method of claim 12, wherein the voice messaging system comprises a server and at least one client and the steps of the method of claim 12 are performed in either one.

17. The method of claim 12, wherein the voice messaging system comprises a server and at least one client and the steps of the method of claim 12 are distributed between them.

18. A voice messaging system comprising:

a client;

a server for (a) storing a voice message, (b) verifying a speaker of the voice message as being from a set of N target speakers, where N>1, and (c) providing speaker verification information to the client;

wherein the server uses a discriminative Gaussian mixtue model (GMM) for verifying the speaker, and wherein the discriminative GMM is based at least upon characteristics of all of the N target speakers; and wherein the speaker is identified as being one of said N speakers.

19. The system of claim 18 wherein the speaker verification information is further incorporated into a confidence level.

20. Voice messaging apparatus comprising:

means for receiving a voice message; and a processor that verifies a speaker of the voice message as belonging to a set of N possible speakers, where N>1;

wherein the processor uses a discriminative Gaussian Mixture Model (GMM) for verifying the speaker, and where the same discriminative GMM is used for all the N possible speakers and wherein the discriminative GMM is based at least upon characteristics of all N possible speakers.

21. An article of manirware for use in performing speaker verification comprising a machine readable medium comprising one or more programs which when executed implement the step of:

using a discriminative Gaussian mixture model (DGMM) for use in associating a message with an unspecified speaker from a set of N possible speakers, where N>1, such that the DGMM uses one GMM for the N possible speakers;

wherein said DGMM is based at least upon characteristics of all of the N possible speakers.

22. The program of claim 21 further comprising the step of using a binary classifier for selecting the unspecified speaker.

23. The program of claim 22 wherein the binary classifier is a support vector machine.

24. The program of claim 21 further comprising the steps of:

training the DGMM on speech;

generating support vector machine training data by clustering data resulting from the training step; and using at least one support vector machine for selecting the associated speaker.

25. The program of claim 24 wherein the speech used for DGMM training includes speech from the N possible speakers.

26. The program of claim 24, wherein the using step uses one or more support vector machines to process a speech sample if other processing of the speech sample relative to a predefined threshold indicates that the speech sample exceeds the predefined threshold.

27. The program of claim 26, wherein the predefined threshold is a measure of a likelihood that the speech sample came from one of the clusters.

* * * * *